United States Patent
Piccardi

(10) Patent No.: US 9,185,750 B2
(45) Date of Patent: Nov. 10, 2015

(54) LATERAL HOIST FOR ELECTRODE COLUMNS OF ELECTRIC ARC MELTING FURNACES

(75) Inventor: Thomas Piccardi, Dalmine (IT)

(73) Assignee: PICCARDI S.R.L., Dalmine, Bergamo (IT)

(*) Notice: Subject to any disclaimer, the term of this patent is extended or adjusted under 35 U.S.C. 154(b) by 1333 days.

(21) Appl. No.: 12/763,389

(22) Filed: Apr. 20, 2010

(65) Prior Publication Data

US 2010/0272146 A1   Oct. 28, 2010
US 2011/0274137 A9   Nov. 10, 2011

(30) Foreign Application Priority Data

Apr. 27, 2009   (IT) .............................. BG2009A0019

(51) Int. Cl.
*H05B 7/14* (2006.01)
*H05B 7/10* (2006.01)
*F27D 11/10* (2006.01)

(52) U.S. Cl.
CPC *H05B 7/14* (2013.01); *F27D 11/10* (2013.01); *H05B 7/10* (2013.01)

(58) Field of Classification Search
CPC ............ F27D 11/10; H05B 7/06; H05B 7/10; H05B 7/14; H05B 7/103; H05B 7/152; H05B 7/156; H05B 7/085

USPC ............... 373/91, 92, 94, 100, 86, 88, 98, 99, 373/101, 69, 51, 52, 81, 96, 97; 266/44; 29/746, 240, 760
See application file for complete search history.

(56) References Cited

U.S. PATENT DOCUMENTS

| 1,702,359 | A | * | 2/1929 | Molmark ................ 373/100 |
| 2,899,477 | A | * | 8/1959 | Cartoux .................. 373/99 |
| 3,198,870 | A | * | 8/1965 | Simpkin et al. ......... 373/94 |
| 3,626,573 | A |   | 12/1971 | Blake |
| 4,736,384 | A | * | 4/1988 | Sakai et al. ............. 373/92 |

FOREIGN PATENT DOCUMENTS

| GB | 143 292 | 5/1920 |
| IT | 1 192 885 | 5/1988 |
| JP | 11 268881 | 10/1999 |

* cited by examiner

*Primary Examiner* — Hung D Nguyen
(74) *Attorney, Agent, or Firm* — King & Schickli, PLLC

(57) ABSTRACT

A device for moving electrode columns of electric arc melting furnaces, characterised by consisting essentially of a lever the central fulcrum of which is connected to the hook of the overhead crane by an articulated ring, on one side a coupling mechanism being inserted into a tube and intended for coupling to the electrode column, while on the other side a counterweight of predetermined weight balances the device during its movement.

10 Claims, 2 Drawing Sheets

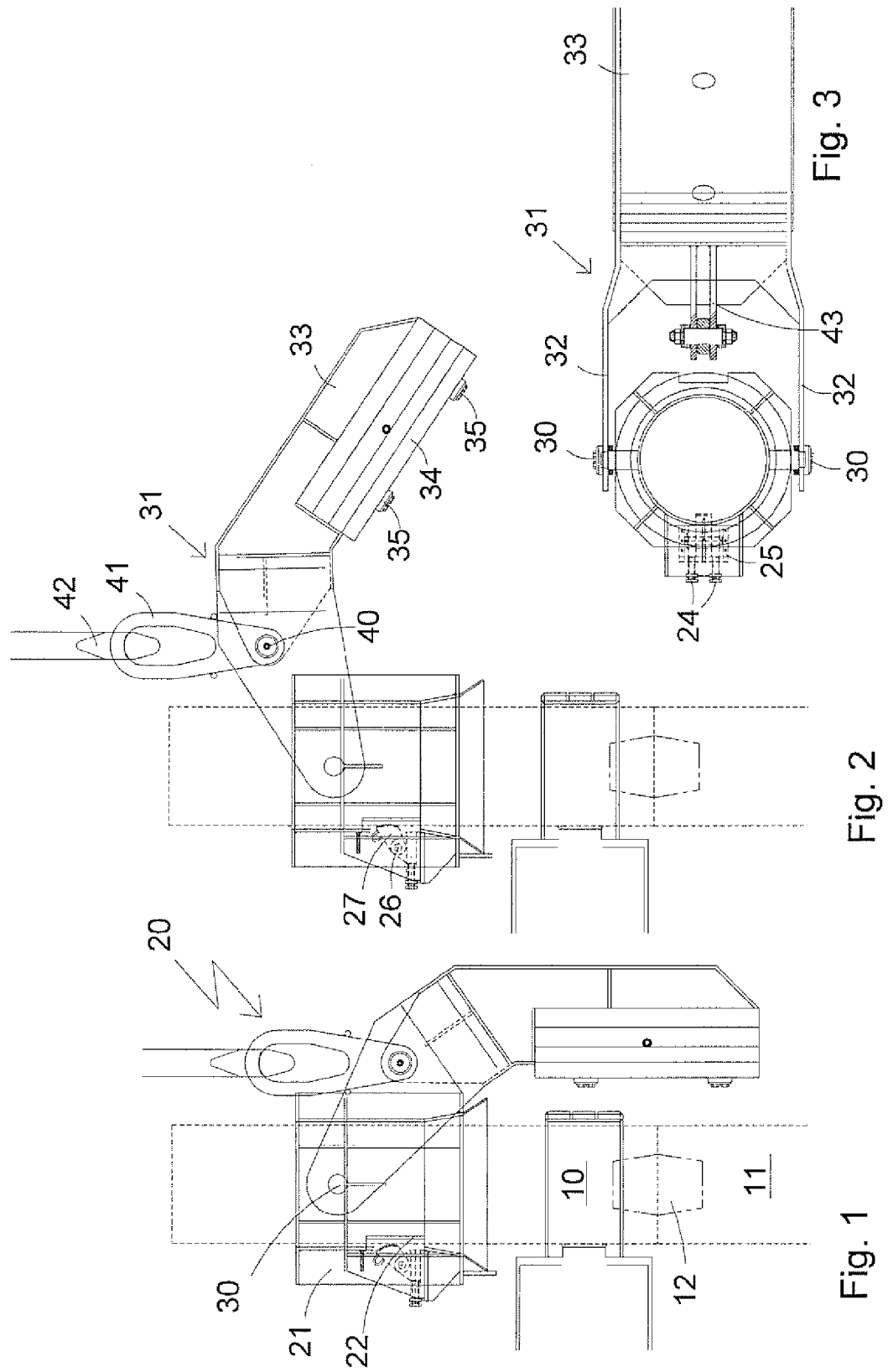

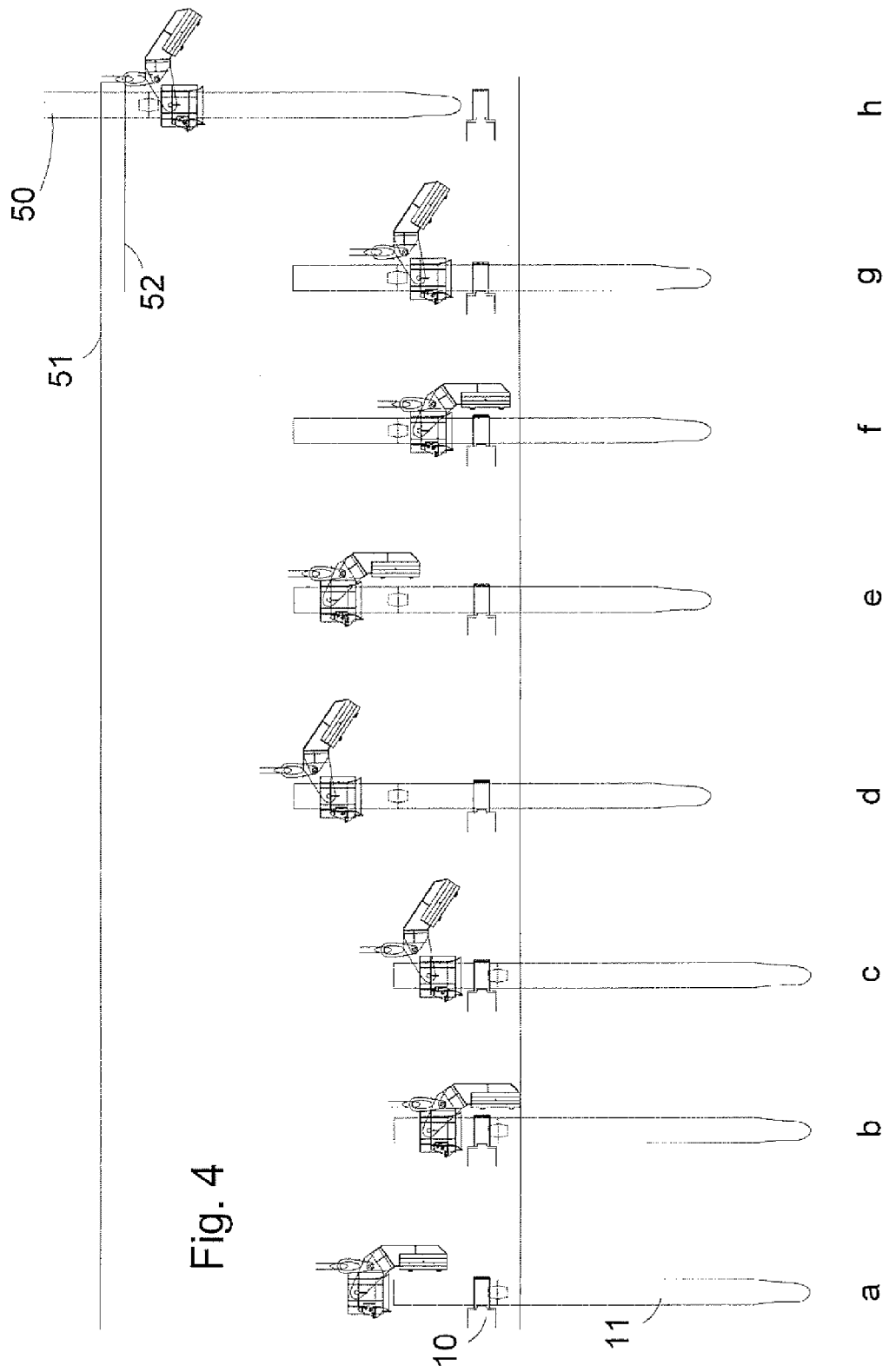

LATERAL HOIST FOR ELECTRODE COLUMNS OF ELECTRIC ARC MELTING FURNACES

The present invention relates to a lateral hoist for electrode columns of electric arc melting furnaces, and in particular to a device for manipulating electrode columns of electric arc melting furnaces.

In particular, it relates to a device for inserting and extracting electrode columns into and from electric arc melting furnaces in those cases in which the electrode columns are longer than allowed by the maximum height of the overhead crane hook.

Melting furnaces are known to exist (generally used in the steel industry) which utilize heat released by electric arcs created by graphite electrodes formed in several pieces.

These electrode pieces have diameters up to 800 mm and lengths up to more than 3 meters, and are butt-screwed together to form a so-called electrode column of up to more than 10 meters length.

This column is vertically coupled, by a transport nipple or the like, to the hook of an overhead crane which raises it as high as possible and inserts it into a clamp above the furnace cover, in a position corresponding to a hole existing in the cover itself.

The overhead crane lowers the column into the clamp to the required position, the clamp is closed onto the electrode and the furnace as able to start melting.

The maximum length of the electrode column is evidently limited by the distance between the maximum height of the overhead crane hook and the minimum height of the electrode carrier clamp.

Beyond this length it would not be possible to transport the electrode column above the electrode carrier clamp and insert it therein.

The electrodes are also known to wear down, and when the column reaches its minimum length limit it has to be lengthened by screwing an electrode piece onto its top.

This lengthening operation requires stoppage of the melting operation, with consequent economic damage.

Another operation in which the electrodes have to be moved is during furnace maintenance/cleaning, for which the electrodes have to be completely extracted.

It is of interest to steelworks to execute as few lengthening operations as possible, and hence use longer electrode pieces; this could be achieved by increasing the height of the overhead crane hook, but this is often an impossible operation and in any event very costly.

Some steelworks have devised an alternative system, consisting of using equipment which couple the electrode column laterally instead of abuttingly; lateral coupling enables the distance necessary between the overhead crane and furnace clamp to be decreased, because height is recovered.

This equipment is of the most varied types and ranges from the simple but dangerous use of a rope tightened and knotted about the electrode, to complex and costly hydraulic devices.

An object of the invention is to define a device for moving electrode columns from electric arc melting furnaces which is very simple, of low cost, safe and automatic; this makes it possible to use longer electrode pieces than those currently used.

This and further objects are attained according to the present invention by a device for moving electrode columns of electric arc melting furnaces, characterised by comprising a tubular coupling device on one of said electrodes; a lever associated with a predetermined weight rotatably fixed to said coupling device; said lever presenting a fulcrum fixed to a hook of a lifting device; said coupling device being lateral to said fulcrum.

Further characteristics of the invention are described in the dependent claims.

The invention consists essentially of a lever the central fulcrum of which is connected to the hook of the overhead crane by an articulated ring, on one side thereof a coupling mechanism being inserted into a tube and intended for coupling to the electrode column, while on the other side a counterweight of predetermined weight balances the device during its movement.

By virtue of the present invention, electrode columns can be inserted into and extracted from furnaces very simply with total safety.

Electrodes longer than usual can also be used, and hence minimize furnace stoppages for the lengthening pieces.

Although having a lateral grip, and although the electrode weight varies on the basis of its length, weight balancing is automatically achieved, and in addition the electrode is maintained vertical.

The characteristics and advantages of the present invention will be apparent from the ensuing detailed description of one embodiment thereof, illustrated by way of non-limiting example in the accompanying drawings, in which:

FIG. 1 is a side view of a device for moving electrode columns of electric arc melting furnaces according to the invention, shown in a first position in which it has already been mounted on the electrode column but is not yet coupled to it, the counterweight hence being in a vertical position parallel to the column itself;

FIG. 2 is a side view of a device for moving electrode columns of electric arc melting furnaces according to the invention, shown in a second position in which the electrode column has been coupled and the counterweight has been rotated and moved laterally to balance the greater weight of the other side;

FIG. 3 is a view from above of a device for moving electrode columns of electric arc melting furnaces according to the invention, shown in the second position;

FIGS. 4a-h are a side view of a device for moving electrode columns of electric arc melting furnaces according to the invention, including an electrode column, shown in its various positions during the movement of an electrode column.

A melting furnace comprises from one to three clamps 10, positioned above the furnace cover in a position corresponding with an existing hole in said cover, which are fixed and supply current to several electrode columns 11. The electrode columns 11 comprise several pieces which are screwed together at 12.

With reference to the accompanying figures, a device for moving electrode columns 11 of electric arc melting furnaces, according to the present invention, comprises a clamping structure 21, of substantially tubular shape, adapted to surround an electrode column 11. Its internal diameter is hence slightly greater than the diameter of an electrode 11.

A lateral portion of the clamping structure 21 presents an aperture 22 from which access can be gained to the exterior of the electrode 11.

To the side of the aperture 22, a support plate 25 supports a cam device 27, the horizontal position of which relative to the electrode 11 can be regulated by two adjustable bolts 24.

The cam 27, which has an elongated shape, has one end pivoted on the pin 26, and its opposite end resting on the surface of the electrode 11.

The clamping structure 21 comprises two lateral pins 30 positioned preferably on the longitudinal axis of the electrode 11, on which a frame 31 for the counterweight, of fork shape, can rotate. The two sides of the fork are pivoted on the pins 30, while the single portion 33 of the fork is formed such as to support the counterweight 34. The counterweight 34 is fixed to the portion 33 by bolts 35.

The counterweight frame 31 is composed of the two sides 32 of the fork and by its single portion 33. They are joined together. Their length and the inclination between the parts are such that when in the rest position, the single portion 33 lies practically vertical and parallel to the electrode 11.

On the two sides 32 of the fork, in proximity to their connection to the single portion 33, a pin 40 is provided on which an articulated lifting ring is pivoted.

In detail, two shoulders 43 are fixed to the single portion 33 such that they are spaced between the two sides 32 of the fork. The shoulders 43 are holed to enable the pin 40 to be positioned.

The lifting ring 41 is hooked by the hook 42 of an overhead crane (not shown).

When in its rest position, the pin 40 lies below the lateral pins 30, close to the longitudinal axis of the electrode 11.

FIGS. 4a to 4h show the movement stages of an electrode 11. On extracting the electrodes from the furnace, melting is halted and the following operations are carried out according to the present invention.

In FIG. 4a, the device 20 is positioned above the electrode 11 by the overhead crane and the electrode made to enter through the central hole of the clamping structure 21. The counterweight frame 31 is in its rest position with the single portion 33 virtually vertical. The counterweight 34 has merely to balance the weight of the clamping structure 21.

In FIG. 4b, the clamping structure 21 is made to slide along the electrode 11 until it reaches the clamp 10. During this operation the cam 27, being normally inclined upwards, slides freely, opposing a practically negligible friction against the electrode 11.

In FIG. 4c, the overhead crane raises its hook 42, which in its turn raises the device 20. At this point the cam 27 comes into play which, by virtue of its construction, grips with its toothed surface the electrode 11, to secure it to the clamping structure 21. The hook 42 has now to lift a further weight due to the weight of the electrode 11. To balance this new weight, the single portion 33 of the fork with its counterweight 34 is raised by the amount required to balance the weight. The pin 40 acts as the fulcrum of a lever, and as the arm between the pin 40 and the pin 30 is different in length than the arm between the pin 40 and the barycentre of the counterweight 34, which is variable (depending on the height to which the pin 40 is brought), an equilibrium point which balances the weight of the electrode 11 will always be found, this being an important fact which maintains it vertical.

In FIG. 4d, the clamp 10 is opened and the electrode 11 is lifted. In FIG. 4e, having reached a first height, if this is insufficient to extract the electrode column from the melting furnace, the clamp is reclosed to again lock the electrode 11, the hook 42 is lowered, and the cam 27 is automatically released from its position, to free the movement of the clamping structure 21.

In FIG. 4f, the device is again lowered until the clamp 10 is reached, to attain a situation similar to that of FIG. 4b.

In FIG. 4g, the device 20 again clamps the electrode 11, to attain a situation similar to that of FIG. 4c.

In FIG. 4h, the clamp 10 is opened, and the electrode 11 raised until its complete extraction from the clamp 10.

Advantageously, the electrode 11 can be raised even if its length is such that its upper end 50 exceeds the height 51 of the overhead crane.

This is also achievable if the maximum height 52 reachable by the overhead crane hook 41 is (evidently) less than the overhead crane height 51.

The electrode 11 is positioned to the side of the lifting ring 41 and of the overhead crane hook 42 and not on the same axis as these, hence its upper end 50 can exceed the overhead crane height 51. The weight of the counterweight 34 can be varied as required, on the basis of the maximum weight of the electrode column to be raised, taking into account the fact that when the barycentre of the counterweight 34 is at the same height as the pin 40, the maximum balanceable weight has been reached.

The materials used and the dimensions can be chosen at will in accordance with requirements and with the state of the art.

The system conceived in this manner is susceptible to numerous modifications and variants, all falling within the scope of the inventive concept; moreover all details can be replaced by technically equivalent elements.

The invention claimed is:

1. A device for moving electrode columns of electric arc melting furnaces, comprising:
    a tubular coupling device configured to surround and secure one of the electrode columns having an elongated cam able to be locked against said one of said electrode columns when it is required to raise said device for moving electrode columns;
    a lever having a rotatable, fork-shaped frame with two sides and a single portion, whereby the two sides of the fork-shaped frame are pivotable with respect to the tubular coupling device; said lever presenting a fulcrum fixed to a hook of a lifting device; said tubular coupling device being lateral to said fulcrum; and
    a counterweight of predetermined weight is fixed to the single portion of the fork-shaped frame of the lever; said fulcrum is positioned in a asymmetric position with respect to a length of the lever, the counterweight of predetermined weight is raised by said lifting device of an amount required to balance the weight of said one of the electrode columns to maintain said one of the electrode columns vertical during movement of the lifting device,
    wherein the elongated cam is operable in a closed position such that the elongated cam grips a surface of said one of the electrode columns to secure said one of the electrode columns to the tubular coupling device when the hook is raised and the elongated cam is automatically releasable from said closed position to allow movement of the tubular coupling device when the hook is lowered.

2. A device as claimed in claim 1, characterised in that said counterweight of predetermined weight is adaptable to the maximum weight of the electrode column to be raised.

3. A device as claimed in claim 1, characterised in that said counterweight of predetermined weight is fixed to said lever on the opposite side to that to which said tubular coupling device is fixed.

4. A device as claimed in claim 1, further comprising at least one bolt for fixing said counterweight of predetermined weight to the single portion of the fork-shaped frame.

5. A device as claimed in claim 4, characterised in that said fulcrum comprises a pin positioned in proximity to the joint between said two sides of the fork-shaped frame and said single portion of the fork-shaped frame.

6. A device for moving electrode columns of electric arc melting furnaces, comprising:
    a tubular coupling device configured to surround one of the electrode columns having an elongated cam able to be locked against said one of the electrode columns when it is required to raise said device for moving electrode columns;

a lever including a rotatable, fork-shaped frame having with two sides and a single portion; said lever presenting a fulcrum fixed to a hook of a lifting device; and a counterweight of predetermined weight fixed directly to the single portion of the fork-shaped frame of the lever for balancing the tubular coupling device during movement, wherein the elongated cam is operable in a closed position such that the elongated cam grips a surface of said one of the electrode columns to secure said one of the electrode columns to the tubular coupling device when the hook is raised and the elongated cam is automatically releasable from said closed position to allow movement of the tubular coupling device when the hook is lowered, whereby the counterweight of predetermined weight is raised by the lifting device an amount required to balance said one of the electric columns and maintain said one of the electric columns vertical during movement of the lifting device.

7. A device for moving electrode columns of electric arc melting furnaces, comprising:

a tubular coupling device on one of said electrode columns having an aperture for allowing access to said one of the electrode columns, a plated and an elongated cam supported by the plate, said elongated cam having a first end pivoted on a pin and an opposite end resting on said one of said electrode columns; and a lever associated with a counterweight of predetermined weight rotatably fixed to the tubular coupling device, said lever presenting a fulcrum fixed to a hook of a lifting device, said tubular coupling device being lateral to said fulcrum, wherein the elongated cam is operable in a closed position such that the elongated cam grips a surface of said one of the electrode columns to secure said one of the electrode columns to the tubular coupling device when the hook is raised and the elongated cam is automatically releasable from said closed position to allow movement of the tubular coupling device when the hook is lowered, whereby the counterweight of predetermined weight is laterally movable from a first position to a second position to balance the weight of the tubular coupling device and said one of the electrode columns and maintain said one of the electrode columns vertical during movement.

8. A device as claimed in claim 7, wherein the counterweight of predetermined weight is substantially parallel to one of the electrode columns in the first position.

9. A device as claimed in claim 7, wherein the counterweight of predetermined weight is not substantially parallel to one of the electrode columns in the second position.

10. A device as claimed in claim 7, wherein the elongated cam is horizontally positionable relative to said one of said electrode columns by a pair of adjustable bolts.

* * * * *